United States Patent
Yun et al.

(10) Patent No.: US 11,479,643 B2
(45) Date of Patent: *Oct. 25, 2022

(54) POLYIMIDE PRECURSOR SOLUTION AND POLYIMIDE FILM PRODUCED USING SAME

(71) Applicant: LG CHEM, LTD., Seoul (KR)

(72) Inventors: Cheolmin Yun, Daejeon (KR); Jinyoung Park, Daejeon (KR); Bora Shin, Daejeon (KR); Kyungjun Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 232 days.

This patent is subject to a terminal disclaimer.

(21) Appl. No.: 16/617,379

(22) PCT Filed: Jun. 27, 2018

(86) PCT No.: PCT/KR2018/007271
§ 371 (c)(1),
(2) Date: Nov. 26, 2019

(87) PCT Pub. No.: WO2019/066204
PCT Pub. Date: Apr. 4, 2019

(65) Prior Publication Data
US 2020/0095376 A1    Mar. 26, 2020

(30) Foreign Application Priority Data

Sep. 29, 2017 (KR) .......... 10-2017-0127716
Jun. 1, 2018 (KR) .......... 10-2018-0063124

(51) Int. Cl.
*C08G 73/10* (2006.01)
*C08J 5/18* (2006.01)

(52) U.S. Cl.
CPC ..... *C08G 73/1032* (2013.01); *C08G 73/1067* (2013.01); *C08J 5/18* (2013.01); *C08J 2379/08* (2013.01)

(58) Field of Classification Search
CPC ..... C08J 2379/08; C08J 5/18; C08G 73/1032; C08G 73/1071; C08G 73/10; C08L 79/08; C08L 2203/16
See application file for complete search history.

(56) References Cited

U.S. PATENT DOCUMENTS 9,278,488 B2  3/2016  Park et al.
9,828,469 B2  11/2017  Wakita et al.
10,544,266 B2  1/2020  Yun et al.
10,647,883 B2  5/2020  Yun et al.
2016/0039974 A1  2/2016  Sun et al.
2017/0009017 A1  1/2017  Huang et al.
2017/0096530 A1  4/2017  Yun et al.
2017/0137571 A1  5/2017  Nakayama et al.
2019/0055428 A1  2/2019  Ashibe et al.

FOREIGN PATENT DOCUMENTS

| | | |
|---|---|---|
| CN | 103930489 A | 7/2014 |
| CN | 105637016 A | 6/2016 |
| CN | 106133025 A | 11/2016 |
| CN | 106928707 A | 7/2017 |
| CN | 107001681 A | 8/2017 |
| EP | 3150655 A1 | 4/2017 |
| EP | 3266808 A1 | 1/2018 |
| EP | 3 536 732 A1 | 9/2019 |
| JP | 2009-007580 A | 1/2009 |
| JP | 2011-256329 A | 12/2011 |
| JP | 2016-011418 A | 1/2016 |
| JP | 2016-531997 A | 10/2016 |
| JP | 6129285 B2 | 5/2017 |
| JP | 2017-119868 A | 7/2017 |
| JP | 2017-524040 A | 8/2017 |
| JP | 2019-530756 A | 10/2019 |
| KR | 10-2014-0113421 A | 9/2014 |
| KR | 10-2015-0125324 A | 11/2015 |
| KR | 10-2016-0018418 A | 2/2016 |
| KR | 10-2016-0067413 A | 6/2016 |
| KR | 10-2016-0097685 A | 8/2016 |
| KR | 10-2016-0108252 A | 9/2016 |
| KR | WO 2016140559 * | 9/2016 |
| KR | 10-2017-0057458 A | 5/2017 |
| KR | 10-2017-0079896 A | 7/2017 |

(Continued)

OTHER PUBLICATIONS

Chemical Book, CAS No. 617-84-5, N,N-Diethylformamide, retrieved from: https://www.chemicalbook.com/ChemicalProductProperty_JP_CB6109165.htm, along with English translation, 6 pages.

(Continued)

*Primary Examiner* — Gregory Listvoyb
(74) *Attorney, Agent, or Firm* — Rothwell, Figg, Ernst & Manbeck, P.C.

(57) ABSTRACT

The present invention relates to the production of a polyimide precursor, whereby, by using an amide-based organic solvent having a positive-number partition coefficient (Log P) and a density of at most 1 g/cm3, an interaction between the organic solvent and polyamic acid, which is a polyimide precursor, may be mitigated, thereby enabling the decrease of the viscosity of a polyimide precursor solution, and thus enabling a polyimide precursor solution having high solid content and low viscosity to be obtained.

6 Claims, 2 Drawing Sheets

(56) References Cited

FOREIGN PATENT DOCUMENTS

| TW | 201522421 A | 6/2015 |
|---|---|---|
| TW | 201817776 A | 5/2018 |
| WO | 2013-047451 A1 | 4/2013 |
| WO | 2014-098235 A1 | 6/2014 |
| WO | 2015-198970 A1 | 12/2015 |
| WO | 2017-068936 A1 | 4/2017 |
| WO | 2018-058343 A1 | 4/2018 |

OTHER PUBLICATIONS

International Search Report issued for PCT/KR2018/007271 dated Oct. 2, 2018, 2 pages.
Sigma-Aldrich, Product No. 137529, Safety Data Sheet Version 6.2, Printed Date Jul. 15, 2019, 8 pages.
Extended Search Report issued for corresponding European Patent Application No. 18 863 468.7 dated Feb. 20, 2020, 9 pages.

* cited by examiner

POLYIMIDE PRECURSOR SOLUTION AND POLYIMIDE FILM PRODUCED USING SAME

This application is a 35 U.S.C. 371 National Phase Entry Application from PCT/KR2018/007271, filed Jun. 27, 2018, which claims the benefit of priority to Korean Patent Application Nos. 10-2017-0127716, filed on Sep. 29, 2017 and 10-2018-0063124, filed on Jun. 1, 2018, the entire disclosures of which are incorporated herein by reference.

BACKGROUND OF THE INVENTION

1. Field of the Invention

The present invention relates to a polyimide precursor solution having a high solid content and a low viscosity and a polyimide film prepared using the same.

2. Description of the Related Art

Polyimide (PI) is a polymer having a relatively low crystallinity or mostly noncrystalline structure, which has an advantage that it is easy to synthesize, can form a thin film and does not require a crosslinking agent for curing. Also, polyimide is a polymeric material that has excellent heat resistance and chemical resistance, excellent mechanical properties, electrical properties and dimensional stability due to its rigid chain structure in addition to its transparency. Therefore, it is widely used as electrical and electronic materials for automobiles, aerospace, flexible circuit boards, liquid crystal alignment films for LCDs, and adhesives and coatings.

Generally, a flexible device is manufactured by applying a polyimide precursor solution onto a carrier substrate and then curing to form a film, completing the device through a subsequent process, and then removing the completed device from the carrier substrate.

Therefore, storage stability at room temperature of the polyimide precursor solution is particularly important. If the storage stability of the polyimide precursor solution is poor and the process viscosity is changed, application and curing processes of the polyimide precursor solution becomes unstable. Polyamic acid, which is a polyimide precursor, is known to have poor storage stability because it has a carboxylic acid that promotes hydrolysis adjacent to an amide bond.

However, a flexible device involving a high-temperature process is required to have high heat resistance. In particular, in the case of an organic light emitting diode (OLED) device using a low temperature polysilicon (LTPS) process, the process temperature may approach 500° C. However, at such a temperature, the polyimide even having excellent heat resistance tends to undergo thermal decomposition.

Further, in the case where a light emitted from a display device is emitted through a film substrate (for example, a bottom emission type organic EL or the like), transparency of the film substrate is required. In particular, it is required to have a high light transmittance in a wavelength region of 400 nm or less which is a visible light region. In addition, when light passes through a retardation film or a polarizing plate, liquid crystal displays, touch panels, and the like, for example, are required to have high transparency.

However, since the imidized polyimide resin has a low solubility, it is difficult to prepare it in a solution state, and its use for coating may be restricted. However, if solubility is to be improved, heat resistance can be reduced, and then if heat resistance is to be improved, light transmittance is lowered.

Therefore, there is a need for a polyimide precursor solution which can exhibit excellent chemical resistance and storage stability due to reduced hydrolysis of the polyimide precursor solution in order to manufacture flexible devices, and simultaneously improve heat resistance and transparency while maintaining mechanical properties.

SUMMARY OF THE INVENTION

A problem to be solved by the present invention is to provide a polyimide precursor solution having a high solid content and a low viscosity.

Other problem to be solved by the present invention is to provide a polyimide film produced using the polyimide precursor solution.

Another problem to be solved by the present invention is to provide a flexible display device comprising the polyimide film.

In order to solve the problems, the present invention provides a polyimide precursor solution comprising a polyimide precursor and an amide-based organic solvent having a positive distribution coefficient (Log P) and a density of 1 $g/cm^3$ or less.

According to one embodiment, when the polyimide precursor solution containing the organic solvent has a solid content of 10 to 25% by weight, the viscosity of the polyimide precursor solution may be 7000 cP or less.

According to one embodiment, the organic solvent may comprise dimethylpropionamide (DMPA) or diethylpropionamide (DEPA).

According to one embodiment, the polyimide precursor contained in the polyimide precursor solution may be a polyamic acid having a repeating structure of Formula 1.

[Formula 1]

In the Formula 1,

X is a tetravalent organic group selected from the group consisting of aromatic, alicyclic, and aliphatic tetravalent organic groups derived from tetracarboxylic dianhydride, and Y comprises a divalent organic group selected from the group consisting of aromatic, alicyclic, and aliphatic divalent organic groups derived from diamine.

According to one embodiment, X is a tetravalent organic group selected from the group consisting of the following formulas 2a to 2g.

[Formula 2a]

[Formula 2b]

[Formula 2c]

[Formula 2d]

[Formula 2e]

[Formula 2f]

[Formula 2g]

In the formulas 2a to 2g, $R_{31}$ to $R_{42}$ may be each independently an alkyl group having 1 to 10 carbon atoms (e.g., a methyl group, an ethyl group, a propyl group, an isopropyl group, a t-butyl group, a pentyl group, a hexyl group, etc.) or a fluoroalkyl group having 1 to 10 carbon atoms (e.g., a fluoromethyl group, a perfluoroethyl group, a trifluoromethyl group, etc.),

$a_1$ is an integer of 0 to 2, $b_1$ is an integer of 0 to 4, $c_1$ is an integer of 0 to 8, $d_1$ and $e_1$ are each independently an integer of 0 to 3, $f_1$ and $g_1$ are each independently an integer of 0 to 4, $h_1$ and $j_1$ are each independently an integer of 0 to 3, $i_1$ is an integer of 0 to 4, $k_1$ and $l_1$ are each independently an integer of 0 to 4, $A_1$, $A_2$ and $A_3$ are each independently selected from the group consisting of a single bond, —O—, —$CR_{46}R_{47}$—, —C(=O)—, —C(=O)O—, —C(=O)NH—, —S—, —$SO_2$—, a phenylene group, and a combination thereof, wherein $R_{46}$ and $R_{47}$ are each independently selected from the group consisting of a hydrogen atom, an alkyl group having 1 to 10 carbon atoms (e.g., a methyl group, an ethyl group, a propyl group, an isopropyl group, a t-butyl group, a pentyl group, a hexyl group, etc.) and a fluoroalkyl group having 1 to 10 carbon atoms (e.g., a fluoromethyl group, a perfluoroethyl group, a trifluoromethyl group, etc.).

According to one embodiment, Y is a divalent organic group selected from the group consisting of the following formulas 4a to 4d.

[Formula 4a]

[Formula 4b]

In the formula 4b, $L_1$ is a single bond, —O—, —CO—, —S—, —$SO_2$—, —$C(CH_3)_2$—, —$C(CF_3)_2$—, —CONH—, —COO—, —$(CH_2)n_1$-, —$O(CH_2)n_2O$—, —$OCH_2$—$C(CH_3)_2$—$CH_2O$— or —$COO(CH_2)n_3OCO$—, and $n_1$, $n_2$ and $n_3$ are each an integer of 1 to 10.

[Formula 4c]

In the formula 4c, $L_2$ and $L_3$, which may be the same or different from each other, are each a single bond, —O—, —CO—, —S—, —$SO_2$—, —$C(CH_3)_2$—, —$C(CF_3)_2$—, —CONH—, —COO—, —$(CH_2)n_1$-, —$O(CH_2)n_2O$—, —$OCH_2$—$C(CH_3)_2$—$CH_2O$— or —$COO(CH_2)n_3OCO$—, and $n_1$, $n_2$ and $n_3$ are each an integer of 1 to 10.

[Formula 4d]

In the formula 4d, $L_4$, $L_5$ and $L_6$, which may be the same or different from each other, are each a single bond, —O—, —CO—, —S—, —$SO_2$—, —$C(CH_3)_2$—, —$C(CF_3)_2$—, —CONH—, —COO—, —$(CH_2)n_1$-, —$O(CH_2)n_2O$—, —$OCH_2$—$C(CH_3)_2$—$CH_2O$— or —$COO(CH_2)n_3OCO$—, and $n_1$, $n_2$ and $n_3$ are each an integer of 1 to 10.

At least one hydrogen atom contained in the aromatic rings of the above formulas 4a to 4d may be unsubstituted or substituted with an alkyl group having 1 to 10 carbon atoms (e.g., a methyl group, an ethyl group, a propyl group, an isopropyl group, a t-butyl group, a pentyl group, a hexyl group, etc.) or a fluoroalkyl group having 1 to 10 carbon atoms (e.g., a fluoromethyl group, a perfluoroethyl group, a trifluoromethyl group, etc.).

According to one embodiment, the polyimide precursor further comprises a structure of the following formula 6 in the molecular structure:

[Formula 6]

wherein, p and q are molar fractions, and when p+q=100, p is 70 to 90 and q is 10 to 30.

In order to solve other problem of the present invention, there is provided a polyimide film produced using the polyimide precursor solution.

According to one embodiment, the polyimide film may have a transmittance of 75% or more in the wavelength range of 380-780 nm.

According to one embodiment, the polyimide film may have a haze of 1 or less.

According to one embodiment, the polyimide film may have a thermal decomposition temperature of 400° C. or higher.

According to one embodiment, the polyimide film may have an elongation of 10% or more, a tensile strength of 30 MPa or more, and a tensile modulus of 1 GPa or more.

According to one embodiment, the polyimide film may have a CTE of −20 to 90 ppm/° C.

Further, the present invention provides a flexible display device comprising the polyimide film.

Effect of the Invention

According to the present invention, by using an amide-based organic solvent having a positive distribution coefficient and a density of 1 g/cm³ or less in the production of a polyimide precursor, an interaction between a polyamic acid which is a polyimide precursor and the organic solvent is alleviated to reduce a viscosity of the polyimide precursor solution. Therefore, the polyimide precursor solution having a high solid content and a low viscosity can be obtained. Further, according to the present invention, the difference in polarity is reduced due to the amphiphilic characteristic of the amide-based solvent having a positive Log P, so that the phase separation phenomenon between the polyamic acid and the organic solvent can be suppressed.

DETAILED DESCRIPTION OF THE INVENTION

Since various modifications and variations can be made in the present invention, particular embodiments are illustrated in the drawings and will be described in detail in the detailed description. It should be understood, however, that the invention is not intended to be limited to the particular embodiments, but includes all modifications, equivalents, and alternatives falling within the spirit and scope of the invention. In the following description of the present invention, detailed description of known functions will be omitted if it is determined that it may obscure the gist of the present invention.

In the present disclosure, all compounds or organic groups may be substituted or unsubstituted, unless otherwise specified. Herein, the term "substituted" means that at least one hydrogen atom contained in the compound or the organic group is substituted with a substituent selected from the group consisting of a halogen atom, an alkyl group having 1 to 10 carbon atoms, a halogenated alkyl group, a cycloalkyl group having 3 to 30 carbon atoms, an aryl group having 6 to 30 carbon atoms, a hydroxyl group, an alkoxy group having 1 to 10 carbon atoms, a carboxylic group, an aldehyde group, an epoxy group, a cyano group, a nitro group, an amino group, a sulfonic group or a derivative thereof.

The polyimide film is one of the materials attracting attention for use as flexible display substrates. The manufacturing process of the polyimide film substrate is as follows. First, a polyamic acid solution that is a polyimide precursor solution is coated on a carrier substrate and thermally cured to form a polyimide film on the carrier substrate. Thereafter, a process necessary for manufacturing the device is performed on the polyimide film, and then the polyimide film is delaminated from the carrier substrate to obtain a flexible display. The most important step of this process is forming a polyimide film on a carrier substrate. When the polyamic acid solution is coated on the carrier substrate, it should be coated with low surface roughness without Mura and bubble generation. However, the polyamic acid has a high polarity, and also a commonly used solvent (for example, N-methylpyrrolidone) has a relatively high polarity. Accordingly, due to the interaction between the solvent and the polyamic acid, the polyamic acid solution has a high viscosity relative to its solid content. This makes it very difficult to control the bubbles generated during coating. In addition, as the solution has a high water-absorption rate, it absorbs water when being left after coating and white turbidity of solution is occurred. In case of thermally curing the coating layer with white turbidity, it may have a high surface roughness and thus defects in the display process are occurred. Therefore, in order to lower the viscosity of the solution to improve processability, it is inevitably required to lower the solid content. However, when the solid content is lowered, the ratio of the solvent is relatively increased, so that a large amount of solvent evaporates during thermal curing, resulting in coating defects.

In order to solve the above conventional problems, the present invention provides a polyimide precursor solution comprising a polyimide precursor and an amide-based organic solvent having a positive distribution coefficient (Log P) and a density of 1 g/cm³ or less.

The distribution coefficient (Log P) can be calculated using an ACD/Log P module of ACD/Percepta platform from ACD/Labs. The ACD/Log P module uses an algorithm based on QSPR (Quantitative Structure-Property Relationship) methodology using 2D molecular structures.

A density of the organic solvent may be 1 g/cm³ or less as measured according to Standard ASTM D1475. If the density is 1 g/cm³ or more, the relative viscosity may be increased and the process efficiency may be reduced.

In the present invention, due to the amphiphilic characteristic of the amide-based solvent having a positive distribution coefficient (Log P), the polarity difference between the polyamic acid and the organic solvent can be reduced and the phase separation between the polyamic acid and the organic solvent can be suppressed.

In the present invention, by using an amide-based organic solvent having a positive Log P and a density of 1 g/cm³ or less as a polymerization solvent for preparing a polyimide precursor and incorporating the amide-based organic solvent in a polyimide precursor solution, the viscosity can be lowered even at a high solid content of 10 to 25% by weight. Specifically, the viscosity of the polyimide precursor solution according to the present invention may be 7,000 cP or less, preferably 6,000 cP or less, and more preferably 5,000 cP or less at the above solid content.

If the viscosity of the polyimide precursor solution is high, efficiency of degassing during processing of the polyimide film is lowered, so that not only process efficiency is lowered but also electrical, optical, and mechanical properties are deteriorated. Accordingly, in the present invention, by using an amide-based solvent having a positive Log P value and a density of 1 g/cm³ or less, there is provided a polyimide precursor solution having a low viscosity even at a high solid content. As a result, the coating defects due to the formation of bubbles can be reduced.

As the amide-based solvent having a positive Log P and a density of 1 g/cm³ or less, various solvents may be used, but particularly, dimethylpropionamide (DMPA) or diethylpropionamide (DEPA) is preferable. This is because due to its relatively low polarity and low boiling point, coating property is excellent, volatility of the solvent is good even at a low temperature and the amount of the solvent remaining in the film after film formation is low.

On the other hand, if polyamic acid meets with water, a salt is formed and white turbidity occurs. As the white turbidity becomes severe, aggregation may occur. When cured in this state, a film with rough surface may be formed. That is, when the haze of the coating of the polyimide-based solution is too high, the coating property is poor and surface roughness may occur after curing. Such improvement of the white turbidity may contribute to improvement of the surface properties after curing.

When the distribution coefficient value is positive, it means that the polarity of the solvent is hydrophobic. According to the studies of the inventors of the present invention, if a specific solvent having a positive distribution coefficient is used to prepare a polyimide precursor solution, the formation of salt by the polyamic acid and water or a polar organic solvent can be suppressed due to low affinity to water, and as a result, the haze can be improved. Therefore, the polyimide-based film according to the present invention can have high heat resistance and mechanical properties together with excellent transparency.

In the process of coating a polyimide precursor solution on a glass substrate, dewetting of the solution may be occurred due to shrinkage of the coating layer during curing or leaving the coating solution. This dewetting phenomenon of the coating solution leads to a variation in the film thickness, resulting in insufficient bending resistance of the film. Therefore, film breakage may occur or edge cracking may appear when cutting. That is, there may be problems of poor processability and lowered yield. If the amide-based solvent having a positive distribution coefficient value according to the present invention is used, the dewetting phenomenon of the polyimide precursor solution can be improved.

If polar fine foreign substances are introduced to the substrate on which the polyimide precursor solution containing a polar solvent having a negative Log P is coated, the polarity of the foreign substances may cause sporadic coating cracks or thickness change around the portions where the foreign substances exist. On the contrary, when a hydrophobic solvent having a positive log P is used, coating cracks, thickness changes, or the like can be reduced or suppressed even when polar fine foreign substances are introduced.

According to one embodiment, the polyimide precursor may be prepared by polymerizing a tetracarboxylic dianhydride and a diamine, and may include a polyamic acid having a repeating structure represented by the following formula 1.

[Formula 1]

In the formula 1,

X is a tetravalent organic group selected from the group consisting of aromatic, alicyclic, and aliphatic tetravalent organic groups derived from tetracarboxylic dianhydride, and

Y comprises a divalent organic group selected from the group consisting of aromatic, alicyclic, and aliphatic divalent organic groups derived from diamine.

X may be a tetravalent organic group selected from the group consisting of the following formulas 2a to 2g.

[Formula 2a]

[Formula 2b]

[Formula 2c]

[Formula 2d]

[Formula 2e]

[Formula 2f]

[Formula 2g]

In the formulas 2a to 2g, $R_{31}$ to $R_{42}$ may be each independently an alkyl group having 1 to 10 carbon atoms (e.g., a methyl group, an ethyl group, a propyl group, an isopropyl group, a t-butyl group, a pentyl group, a hexyl group, etc.) or a fluoroalkyl group having 1 to 10 carbon atoms (e.g., a fluoromethyl group, a perfluoroethyl group, a trifluoromethyl group, etc.), $a_1$ is an integer of 0 to 2, $b_1$ is an integer of 0 to 4, $c_1$ is an integer of 0 to 8, $d_1$ and $e_1$ are each independently an integer of 0 to 3, $f_1$ and $g_1$ are each independently an integer of 0 to 4, $h_1$ and $j_1$ are each independently an integer of 0 to 3, $i_1$ is an integer of 0 to 4, $k_1$ and $l_1$ are each independently an integer of 0 to 4,

$A_1$, $A_2$ and $A_3$ may be each independently selected from the group consisting of a single bond, —O—, —CR$_{46}$R$_{47}$—, —C(=O)—, —C(=O)O—, —C(=O)NH—, —S—, —SO$_2$—, a phenylene group, and a combination thereof, wherein $R_{46}$ and $R_{47}$ may be each independently selected from the group consisting of a hydrogen atom, an alkyl group having 1 to 10 carbon atoms (e.g., a methyl group, an ethyl group, a propyl group, an isopropyl group, a t-butyl group, a pentyl group, a hexyl group, etc.) and a fluoroalkyl group having 1 to 10 carbon atoms (e.g., a fluoromethyl group, a perfluoroethyl group, a trifluoromethyl group, etc.).

For example, X may be selected from the group consisting of tetravalent organic groups of the following formulas (3a) to (3s).

(3a)

(3b)

(3c)

(3d)

(3e)

(3f)

(3g)

(3h)

(3i)

(3j)

(3k)

(3l)

(3m)

-continued (3n)
(3o)
(3p)
(3q)
(3r)
(3s)

At least one hydrogen atom present in the tetravalent organic group of formulas 3a to 3s may be substituted with a substituent selected form the group consisting of an alkyl group having 1 to 10 carbon atoms (e.g., a methyl group, an ethyl group, a propyl group, an isopropyl group, a t-butyl group, a pentyl group, a hexyl group, etc.), a fluoroalkyl group having 1 to 10 carbon atoms (e.g., a fluoromethyl group, a perfluoroethyl group, a trifluoromethyl group, etc.), a hydroxyl group, a sulfonic acid group and a carboxylic group.

Y may be a divalent organic group selected from the group consisting of the following formulas 4a to 4d.

[Formula 4a]
[Formula 4b]

In the formula 4b, $L_1$ is a single bond, —O—, —CO—, —S—, —SO$_2$—, —C(CH$_3$)$_2$—, —C(CF$_3$)$_2$—, —CONH—, —COO—, —(CH$_2$)$n_1$-, —O(CH$_2$)$n_2$O—, —OCH$_2$—C(CH$_3$)$_2$—CH$_2$O— or —COO(CH$_2$)$n_3$OCO—, and $n_1$, $n_2$ and $n_3$ are each an integer of 1 to 10.

[Formula 4c]

In the formula 4c, $L_2$ and $L_3$, which may be the same or different from each other, are each a single bond, —O—, —CO—, —S—, —SO$_2$—, —C(CH$_3$)$_2$—, —C(CF$_3$)$_2$—, —CONH—, —COO—, —(CH$_2$)$n_1$-, —O(CH$_2$)$n_2$O—, —OCH$_2$—C(CH$_3$)$_2$—CH$_2$O— or —COO(CH$_2$)$n_3$OCO—, and $n_1$, $n_2$ and $n_3$ are each an integer of 1 to 10.

[Formula 4d]

In the formula 4d, $L_4$, $L_5$ and $L_6$, which may be the same or different from each other, are each a single bond, —O—, —CO—, —S—, —SO$_2$—, —C(CH$_3$)$_2$—, —C(CF$_3$)$_2$—, —CONH—, —COO—, —(CH$_2$)$n_1$-, —O(CH$_2$)$n_2$O—, —OCH$_2$—C(CH$_3$)$_2$—CH$_2$O— or —COO(CH$_2$)$n_3$OCO—, and $n_1$, $n_2$ and $n_3$ are each an integer of 1 to 10.

For example, Y may be selected from the group consisting of divalent organic groups of the following formulas 5a to 5p.

(5a)

(5b)

(5c)

(5d)

(5e)

(5f)

(5g)

(5h)
(5i)
(5j)
(5k)
(5l)
(5m)
(5n)
(5o)
(5p)

At least one hydrogen atom in the divalent organic group of formulas 5a to 5p may be substituted with a substituent selected form the group consisting of an alkyl group having 1 to 10 carbon atoms (e.g., a methyl group, an ethyl group, a propyl group, an isopropyl group, a t-butyl group, a pentyl group, a hexyl group, etc.), a fluoroalkyl group having 1 to 10 carbon atoms (e.g., a fluoromethyl group, a perfluoroethyl group, a trifluoromethyl group, etc.), an aryl group having 6 to 12 carbon atoms (e.g., a phenyl group, a naphthalenyl group, etc.), a hydroxyl group, a sulfonic acid group and a carboxylic group.

The polyimide precursor may further comprise a structure of the following formula in the structure:

[Formula 6]

wherein, p and q are molar fractions, and when p+q=100, p is 70 to 90 and q is 10 to 30.

For example, the siloxane structure of formula 6 may be formed by further including a diamine of formula 7 as a polymerization component.

[Formula 7]

According to one embodiment, the diamine compound having the structure of formula 7 may have a molecular weight of 4000 g/mol or more, 4200 g/mol or more, or 4400 g/mol or more, and 6000 g/mol or less, or 5500 g/mol or less, or 5000 g/mol or less. Here, the molecular weight means a weight average molecular weight, and can be calculated by calculating amine equivalent using NMR analysis or acid-base titration.

The reaction of tetracarboxylic dianhydride and diamine may be carried out by a conventional polymerization method of polyimide precursor such as solution polymerization. Specifically, diamine is dissolved in an organic solvent and then is subjected to a polymerization reaction by adding tetracarboxylic dianhydride. The reaction may be carried out in an inert gas or a nitrogen stream, and may be carried out under anhydrous conditions.

The polymerization reaction may be carried out at a temperature of −20° C. to 60° C., preferably 0° C. to 45° C. If the reaction temperature is too high, the reactivity may become high and the molecular weight may become large, and the viscosity of the precursor composition may increase, which may be unfavorable in the process.

The polymerized polyamic acid may have a molecular weight of 50,000 to 200,000 g/mol, or 60,000 to 150,000 g/mol.

Then, the obtained polyimide precursor as a result of the polymerization reaction may be imidized to prepare a transparent polyimide film. At this time, the imidization process may be a chemical imidization or thermal imidization process. Preferably, the polyimide precursor solution is coated on a substrate, followed by heat treatment to imidize the polyamic acid.

The polyimide precursor composition may be in the form of a solution in which the polyimide precursor is dissolved in an organic solvent. For example, when the polyimide precursor is synthesized in an organic solvent, the solution may be the reaction solution as obtained, or may be obtained by diluting this reaction solution with another solvent. When the polyimide precursor is obtained as a solid powder, it may be dissolved in an organic solvent to prepare a solution.

A method for producing a film with a polyimide precursor solution according to the present invention comprises the steps of:

applying the polyimide precursor solution onto a substrate; and heat treating the applied polyimide precursor solution.

As the substrate, a glass substrate, a metal substrate, a plastic substrate, or the like can be used without any particular limitation. Among them, a glass substrate may be preferable which is excellent in thermal and chemical stability during the imidization and curing process for the polyimide precursor and can be easily separated even without any treatment with additional release agent without damaging the formed polyimide film after curing.

The applying step may be carried out according to a conventional application method. Specifically, a spin coating method, a bar coating method, a roll coating method, an air knife method, a gravure method, a reverse roll method, a kiss roll method, a doctor blade method, a spray method, a dipping method, a brushing method, or the like may be used. Of these, it is more preferable to carry out by a casting method which allows a continuous process and enables to increase the imidization rate of the polyimide.

In addition, the polyimide precursor solution may be applied on the substrate in a thickness such that the polyimide film to be finally produced has a thickness suitable for a display substrate.

Specifically, it may be applied in an amount such that the thickness is 10 to 30 μm. After the application of the polyimide precursor solution, a drying process for removing the solvent remained in the polyimide precursor solution may be further optionally performed prior to the curing process.

The drying process may be carried out according to a conventional method. Specifically, the drying process may be carried out at a temperature of 140° C. or lower, or from 80° C. to 140° C. If the drying temperature is lower than 80° C., the drying process becomes longer. If the drying temperature exceeds 140° C., the imidization proceeds rapidly, making it difficult to form a polyimide film having a uniform thickness.

The polyimide precursor solution is applied on a substrate and heat-treated in an IR oven, in a hot air oven, or on a hot plate. The heat treatment temperature may range from 300 to 500° C., preferably from 320 to 480° C., and may be performed in a multi-step heating process within the above temperature range. The heat treatment process may be performed for 20 to 70 minutes, and preferably for 20 to 60 minutes.

The organic solvent contained in the polyimide precursor solution of the present invention may be the same as the organic solvent used in the synthesis reaction. The organic solvent may be an amide-based organic solvent having a positive Log P and a density of 1 g/cm$^3$ or less, for example, it may comprise dimethyl propionamide (DMPA) or diethyl propionamide (DEPA).

The polyimide-based film may have a haze of 1 or less, preferably 0.9 or less, or 0.7 or less, more preferably 0.5 or less, and thus the transparency is improved. At this time, the thickness of the polyimide film may be 8 to 15 μm, preferably 10 to 12 μm.

In addition, the transmittance to light at a wavelength of 380 to 760 nm in a film thickness range of 5 to 30 μm may be 70% or more.

Further, the polyimide film according to the present invention may have excellent heat resistance characteristics depending on the temperature change. For example, the polyimide film according to the present invention may have a thermal expansion coefficient of −20 to 90 ppm/° C. and a thermal decomposition temperature Td_1% of 400° C. or more or 500° C. or more at which the weight decreases by 1%, after the n+1 times heating and cooling processes in a temperature range of 100 to 450° C.

The polyimide-based film has excellent mechanical properties such as a tensile modulus of at least about 1 GPa or at least 3 GPa, a tensile strength of at least about 30 MPa or at least about 100 MPa or at least about 150 MPa, and a maximum elongation of about 15%, or about 10% or more.

Accordingly, the polyimide-based film can be applied to display substrates and devices. Specifically, the device may be a flexible display device such as any solar cell having a flexible substrate (e.g., a flexible solar cell), organic light emitting diode (OLED) lighting (e.g., flexible OLED lighting), any semiconductor device having a flexible substrate, or an organic electroluminescent device, an electrophoretic device, or an LCD device having a flexible substrate.

Hereinafter, embodiments of the present invention will be described in detail so that those skilled in the art can easily carry out the present invention. The present invention may, however, be embodied in many different forms and should not be construed as limited to the embodiments set forth herein.

The solvents used in Examples and Comparative Examples of the present invention are shown in Table 1.

TABLE 1

|  | DMPA | DEPA | DMAc | NMP |
|---|---|---|---|---|
| Boiling point (bp) (° C.) | 175 | 194 | 166 | 202 |
| Flash point (° C.) | 65.8 ± 9.65 | 73.6 ± 9.65 | 63.8 ± 9.6 | 86.1 ± 0.0 |
| Pka | −0.41 ± 0.70 | −0.41 ± 0.70 | −0.41 ± 0.70 | −0.41 ± 0.20 |
| Density (g/cm$^3$) | 0.876 ± 0.06 | 0.870 ± 0.06 | 0.880 ± 0.06 | 1.029 ± 0.06 |
| Log P | 0.256 ± 0.249 | 1.275 ± 0.249 | −0.253 ± 0.249 | −0.637 ± 0.349 |
| Vapor pressure (Torr) | 1.12 | 0.444 | 1.81 | 0.299 |

In Table 1, the abbreviations have the following meanings:

DMPA: Dimethylpropionamide
DEPA: Diethylpropionamide
DMAc: Dimethylacetamide
NMP: 1-Methyl-2-pyrrolidone A viscosity of the polyimide precursor solution was measured at 25° C. with a Brookfield rotational viscometer.

A weight average molecular weight of the polyamic acid was determined by using Gel Permeation Chromatography (GPC) and eluent (THF: DMF 50:50 by volume).

Example 1

279 g of DMPA was charged in a reactor through which nitrogen gas flows, and then 29 g (0.091 mol) of TFMB (2,2'-bis(trifluoromethyl)-4,4'-biphenyl diamine) was added and dissolved while the temperature of the reactor was maintained at 25° C. At the same temperature, 20 g (0.091 mol) of PMDA (Pyromellitic Dianhydride) was added to the TFMB solution and stirred for a predetermined time. DMPA was added in an amount such that the solid content of the polyimide precursor solution obtained from the reaction was 12% by weight. The resulting polyimide precursor solution had a viscosity of 5,010 cP, and the weight average molecular weight of the polyimide precursor, i.e., the polymerized polyamic acid was 101,000 g/mol.

Examples 2 to 10

A polyimide precursor solution was prepared in the same manner as in Example 1 except that the tetracarboxylic dianhydride and the diamine shown in Table 2 were used. The viscosity of the polyimide precursor solution and the molecular weight of the polyamic acid are shown in Table 2.

TABLE 2

| Example No. | Dianhydride | Diamine | Solvent | Solid content (wt %) | Viscosity (cP) | Mw |
|---|---|---|---|---|---|---|
| 1 | PMDA | TFMB | DMPA | 12 | 5010 | 101,000 |
| 2 | —BPFA | TFMB | DMPA | 12 | 3200 | 70,500 |
| 3 | ODPA | TFMB | DMPA | 12 | 4600 | 97,100 |
| 4 | TBIS-BAN | TFMB | DMPA | 12 | 3900 | 93,000 |
| 5 | 6FDA | TFMB | DMPA | 12 | 5100 | 78,000 |
| 6 | PMDA-HS | TFMB | DMPA | 12 | 4500 | 79,000 |
| 7 | TAHQ | TFMB | DMPA | 12 | 4800 | 101,000 |
| 8 | DSDA | TFMB | DMPA | 12 | 3600 | 89,000 |
| 9 | BPDA | PDA | DMPA | 12 | 6800 | 100,000 |
| 10 | BPDA | TFMB | DMPA | 12 | 6700 | 107000 |

In Table 2, the abbreviations have the following meanings:

PMDA: pyromellitic dianhydride
BPFA: 9,9'-bis(3,4-dicarboxyphenyl)fluorene dianhydride
ODPA: 4,4'-oxydiphthalic anhydride
TBIS-BAN: N,N'-(9H-Fluoren-9-ylidenedi-4,1-phenylene)bis[1,3-dihydro-1,3-dioxo-5-isobenzofurancarboxamide]
6FDA: 4,4'-(Hexafluoroisopropylidene)diphthalic anhydride
PMDA-HS: 1R,2S,4S,5R-cyclohexanetetracarboxylic dianhydride
TAHQ: hydroquinone bis(trimellitate anhydride)
DSDA: 3,3',4,4'-Diphenylsulfonetetracarboxylic dianhydride
TFMB: 2,2'-bis(trifluoromethyl)benzidine
PDA: para-phenylenediamine
BPDA: 3,3',4,4"-Biphenyltetracarboxylic dianhydride

Example 11

279 g of DEPA was charged in a reactor through which nitrogen gas flows, and 29 g (0.091 mol) of TFMB (2,2'-bis(trifluoromethyl)-4,4'-biphenyl diamine) was added and dissolved while the temperature of the reactor was maintained at 25° C. At the same temperature, 20 g (0.091 mol) of PMDA (Pyromellitic Dianhydride) was added to the TFMB solution and stirred for a predetermined time. DEPA was added in an amount such that the solid content of the polyimide precursor solution obtained from the reaction was 12% by weight. The resulting polyimide precursor solution had a viscosity of 4300 cP, and the weight average molecular weight of the polymerized polyamic acid was 99,000 g/mol.

Examples 12 to 20

A polyimide precursor solution was prepared in the same manner as in Example 11 except that the tetracarboxylic dianhydride and the diamine shown in Table 3 were used. The viscosity of the polyimide precursor solution and the molecular weight of the polyamic acid are shown in Table 3.

TABLE 3

| cOMP. Example No. | Dianhydride | Diamine | Solvent | Solid content (wt %) | Viscosity (cP) | Mw |
|---|---|---|---|---|---|---|
| 11 | PMDA | TFMB | DEPA | 12 | 4300 | 99,000 |
| 12 | BPFA | TFMB | DEPA | 12 | 2900 | 72,000 |
| 13 | ODPA | TFMB | DEPA | 12 | 3250 | 95,000 |
| 14 | TBIS-BAN | TFMB | DEPA | 12 | 3020 | 91,200 |
| 15 | 6FDA | TFMB | DEPA | 12 | 4600 | 77,000 |
| 16 | PMDA-HS | TFMB | DEPA | 12 | 3810 | 73,000 |
| 17 | TAHQ | TFMB | DEPA | 12 | 4200 | 98,900 |
| 18 | DSDA | TFMB | DEPA | 12 | 3050 | 81,000 |
| 19 | BPDA | PDA | DEPA | 12 | 4800 | 107,000 |
| 20 | BPDA | TFMB | DEPA | 12 | 4600 | 108,000 |

Comparative Example 1

279 g of DMAc was charged in a reactor through which nitrogen gas flows, and 29 g (0.091 mol) of TFMB (2,2'-bis(trifluoromethyl)-4,4'-biphenyl diamine) was added and dissolved while the temperature of the reactor was maintained at 25° C. At the same temperature, 20 g (0.091 mol) of PMDA (Pyromellitic Dianhydride) was added to the TFMB solution and stirred for a predetermined time. DMAc was added in an amount such that the solid content of the polyimide precursor solution obtained from the reaction was 12% by weight. The resulting polyimide precursor solution had a viscosity of 12,000 cP, and the weight average molecular weight of the polymerized polyamic acid was 100,400 g/mol.

Comparative Examples 2 to 10

A polyimide precursor solution was prepared in the same manner as in Comparative Example 1 except that the tetracarboxylic dianhydride and the diamine shown in Table 4 were used. The viscosity of the polyimide precursor solution and the molecular weight of the polyamic acid are shown in Table 4.

TABLE 4

| Example No. | Dianhydride | Diamine | Solvent | Solid content (wt %) | Viscosity (cP) | Mw |
|---|---|---|---|---|---|---|
| 1 | PMDA | TFMB | DMAc | 12 | 12,000 | 100,400 |
| 2 | BPFA | TFMB | DMAc | 12 | 10,600 | 90,500 |
| 3 | ODPA | TFMB | DMAc | 12 | 8,100 | 96,500 |
| 4 | TBIS-BAN | TFMB | DMAc | 12 | 8,200 | 94,500 |
| 5 | 6FDA | TFMB | DMAc | 12 | 8,900 | 98,000 |
| 6 | PMDA-HS | TFMB | DMAc | 12 | 7,100 | 76,500 |
| 7 | TAHQ | TFMB | DMAc | 12 | 8,600 | 100,000 |

TABLE 4-continued

| Example No. | Dianhydride | Diamine | Solvent | Solid content (wt %) | Viscosity (cP) | Mw |
|---|---|---|---|---|---|---|
| 8 | DSDA | TFMB | DMAc | 12 | 7,300 | 91,000 |
| 9 | BPDA | PDA | DMAc | 12 | 10,090 | 102,000 |
| 10 | BPDA | TFMB | DMAc | 12 | 16,000 | 996,000 |

Comparative Example 11

279 g of NMP was charged in a reactor through which nitrogen gas flows, and 29 g (0.091 mol) of TFMB (2,2'-bis(trifluoromethyl)-4,4'-biphenyl diamine) was added and dissolved while the temperature of the reactor was maintained at 25° C. At the same temperature, 20 g (0.091 mol) of PMDA (Pyromellitic Dianhydride) was added to the TFMB solution and stirred for a predetermined time. NMP was added in an amount such that the solid content of the polyimide precursor solution obtained from the reaction was 12% by weight. The resulting polyimide precursor solution had a viscosity of 16,000 cP, and the molecular weight of the polymerized polyamic acid was 109,000 g/mol.

Comparative Examples 12 to 20

A polyimide precursor solution was prepared in the same manner as in Comparative Example 11 except that the tetracarboxylic dianhydride and the diamine shown in Table 5 were used. The viscosity of the polyimide precursor solution and the molecular weight of the polyamic acid are shown in Table 5.

TABLE 5

| Comp. Example No. | Dianhydride | Diamine | Solvent | Solid content (wt %) | Viscosity (cP) | Mw |
|---|---|---|---|---|---|---|
| 11 | PMDA | TFMB | NMP | 12 | 16,000 | 109,000 |
| 12 | BPFA | TFMB | NMP | 12 | 7,300 | 87,000 |
| 13 | ODPA | TFMB | NMP | 12 | 9,800 | 102,000 |
| 14 | TBIS-BAN | TFMB | NMP | 12 | 8,900 | 99,000 |
| 15 | 6FDA | TFMB | NMP | 12 | 8,300 | 82,000 |
| 16 | PMDA-HS | TFMB | NMP | 12 | 8,200 | 80,500 |
| 17 | TAHQ | TFMB | NMP | 12 | 9,700 | 103,000 |
| 18 | DSDA | TFMB | NMP | 12 | 8,900 | 93,000 |
| 19 | PMDA | PDA | NMP | 12 | 15,000 | 108,000 |
| 20 | BPDA | TFMB | NMP | 12 | 19,500 | 110,000 |

As can be seen from the results of Examples 1 to 20 and Comparative Examples 1 to 20, it can be seen that the polyimide precursor solution containing the organic solvent according to the present invention has a low viscosity even at high solid content. On the other hand, it can be seen that since the polyimide precursor solution of the comparative example contains a polar solvent having a negative distribution coefficient, the viscosity thereof is higher than that of Examples at same solid content. It means that the defoaming effect of the bubbles in the solution during production of the polyimide film may be reduced and pores may be generated due to defective defoaming in the film after coating.

Experimental Example 1

Figure 1A:
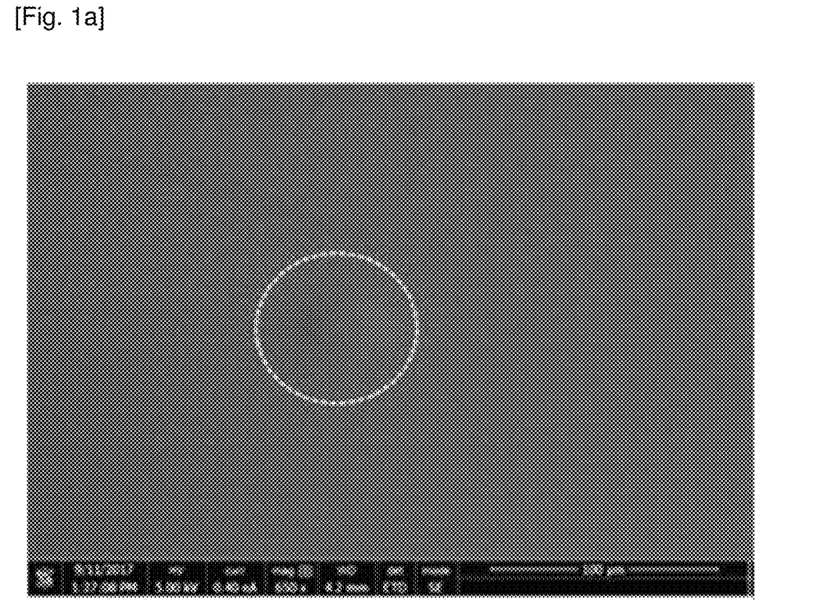
FIGS. 1a and 1b show the results of SEM observation of cross-sections of the film of Comparative Example 1 after treatment with a focused ion beam (FIB).
Figure 1B:
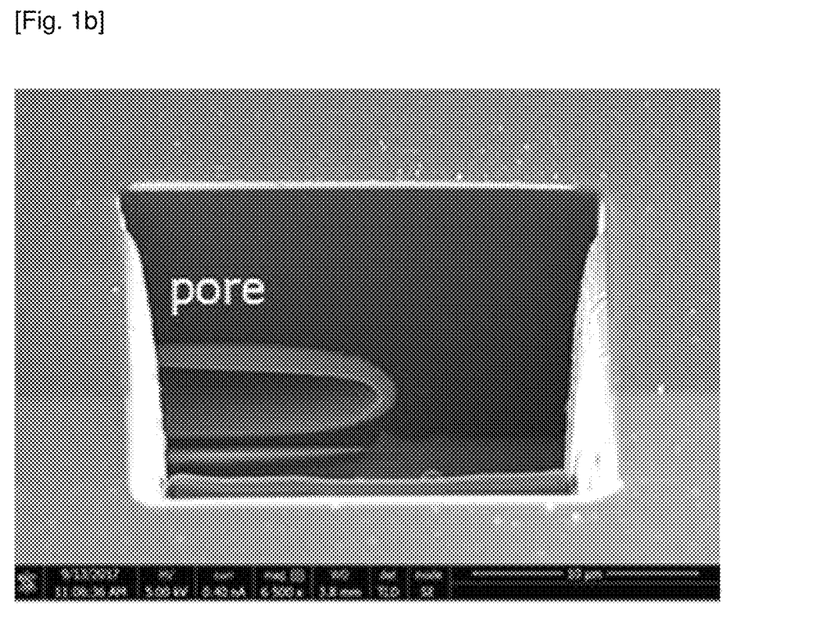
Figure 2A:
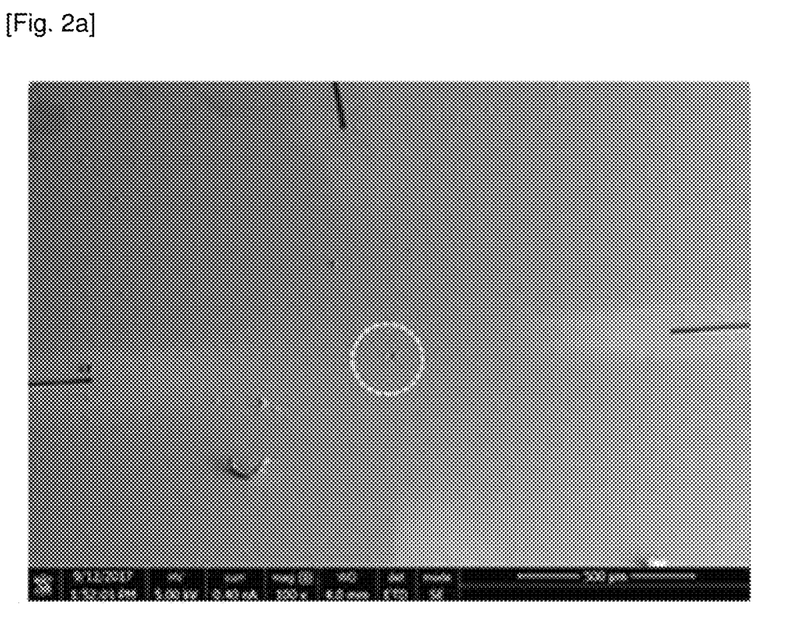
FIGS. 2a and 2b show the results of SEM observation of cross-sections of the film of Example 1 after treatment with a focused ion beam (FIB).
Figure 2B:
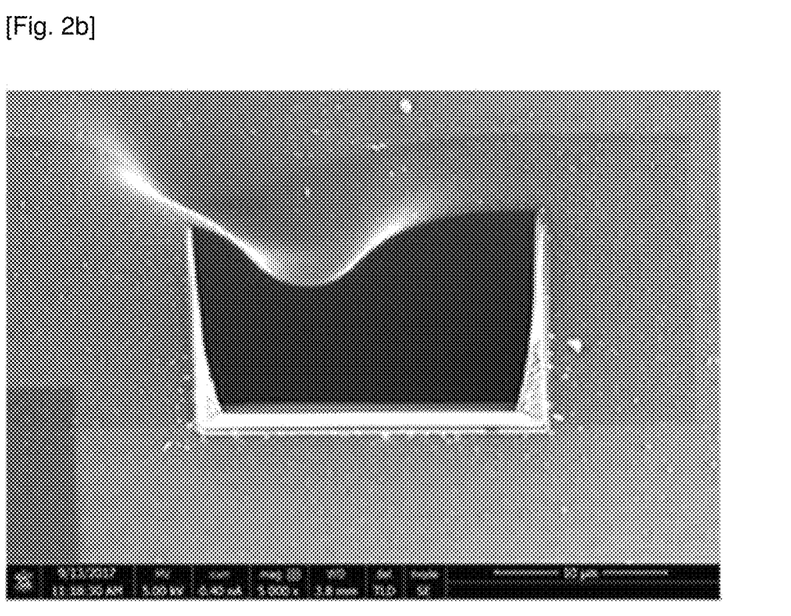

FIGS. 1a and 1b show the results of SEM observation of cross-sections of the film of Comparative Example 1 after treatment with FIB (FIG. 1a: 650× and FIG. 1b: 6500×). FIGS. 2a and 2b show the results of SEM observation of cross-sections of the film of Example 1 after treatment with FIB (FIG. 2a: 100× and FIG. 2b: 5000×).

It can be seen that micro-sized pores exist in the cross-section of the film of Comparative Example 1 in which the defoaming effect is reduced due to the relatively high viscosity of the polyimide precursor solution, while the pores are not present in the cross-section of the film of Example 1.

Experimental Example 2

Each of the polyimide precursor solutions prepared in Examples 1, 2, 5, 9 and 10 was spin-coated onto a glass substrate. The glass substrate coated with the polyimide precursor solution was placed in an oven and heated at a rate of 2° C./min. The curing process was carried out by maintaining at 80° C. for 15 minutes, 150° C. for 30 minutes, 220° C. for 30 minutes, and 380° C. for 1 hour. After completion of the curing process, the glass substrate was immersed in water to remove the film formed on the glass substrate, and then dried in an oven at 100° C. to prepare a polyimide film.

The CTE, the thermal decomposition temperature, the elongation, the tensile strength, the tensile modulus and the transmittance of the film were measured by the following methods, and the results are shown in Table 6.

<Measurement of CTE>

The film was cut into 5×20 mm to prepare a sample, and then the sample was loaded using an accessory. A length of the film to be actually measured was equal to 16 mm. A pulling force was set at 0.02 N. The first temperature-rising step was carried out at a heating rate of 5° C./min from 100 to 400° C., then cooling was carried out at a cooling rate of 4° C./min from 400 to 100° C. The change in the thermal expansion was measured by TMA (Q400, TA Company).

<Measurement of Thermal Decomposition Temperature Td_1%>

The thermal decomposition temperature was measured by the method of ISO 11359.

<Measurement of Elongation, Tensile Strength and Tensile Modulus>

Universal Testing Machine (UTM) of Zwick was used to measure the mechanical properties (tensile modulus, tensile strength, elongation) of the film. The film was cut to a width of 5 mm and a length of 60 mm or more. A distance between the grips was set to 40 mm and the sample was pulled at a speed of 20 mm/min.

<Measurement of Transmittance>

The transmittance was measured with a transmittance meter (model name HR-100, manufactured by Murakami Color Research Laboratory) according to JIS K 7105.

TABLE 6

| | Unit | Example 1 PMDA_TFMB | Example 2 BPFA_TFMB | Example 5 6FDA_TFMB | Example 9 BPDA_PDA | Example 10 BPDA_TFMB |
|---|---|---|---|---|---|---|
| Solid content | wt. % | 12 | 12 | 12 | 12 | 12 |
| Viscosity | cP | 5010 | 3200 | 5100 | 6800 | 6700 |
| Molecular weight | Mw | 101,000 | 70,500 | 78,000 | 100,000 | 107,000 |
| Thickness | μm | 10 | 10 | 10 | 10 | 10 |
| CTE (100~450° C. 1st cooling) | ppm/° C. | −17 | 75 @ ~350° C. | 70 @ ~300° C. | 3.3 | 20 @ ~300° C. |

TABLE 6-continued

| | Unit | Example 1 PMDA_ TFMB | Example 2 BPFA_ TFMB | Example 5 6FDA_ TFMB | Example 9 BPDA_ PDA | Example 10 BPDA_ TFMB |
|---|---|---|---|---|---|---|
| Td_1% | °C. | 535 | 530 | 501 | 565 | 546 |
| Elongation | % | 23 | 15 | 20 | 15.4 | 20 |
| Tensile strength | Mpa | 290 | 150 | 190 | 343.3 | 230 |
| Tensile modulus | Gpa | 7.5 | 3.2 | 3.5 | 9.3 | 4.6 |
| Transmittance ($T_{avar.}$ 380~780 nm) | % | 80 | 88 | 88 | 79 | 89 |

From the results shown in Table 6, it can be seen that it is possible to obtain the polyimide film having excellent mechanical properties and transmittance as well as excellent thermal resistance such as a thermal decomposition temperature of 400° C. or higher, or even 500° C. or higher.

While the present invention has been particularly shown and described with reference to specific embodiments thereof, it will be apparent to those skilled in the art that this specific description is merely a preferred embodiment and that the scope of the invention is not limited thereby. It is therefore intended that the scope of the invention be defined by the claims appended hereto and their equivalents.

What is claimed is:

1. A polyimide precursor solution comprising a polyimide precursor and an amide-based organic solvent, wherein the organic solvent has a positive distribution coefficient (Log P) at 25° C. and a density of 1 g/cm³ or less,
   wherein the organic solvent comprises diethylpropionamide (DEPA).

2. The polyimide precursor solution according to claim 1, wherein the polyimide precursor solution has a solid content of 10 to 25% by weight and a viscosity of 7000 cP or less.

3. The polyimide precursor solution according to claim 1, wherein the polyimide precursor is a polyamic acid having a repeating structure of the following formula 1:

[Formula 1]

wherein,
X is a tetravalent organic group selected from the group of aromatic, alicyclic, and aliphatic tetravalent organic groups derived from tetracarboxylic dianhydride, and
Y comprises a divalent organic group selected from the group of aromatic, alicyclic, and aliphatic divalent organic groups derived from diamine.

4. The polyimide precursor solution according to claim 3, wherein X is a tetravalent organic group selected from the group of the following formulae 2a to 2g:

[Formula 2a]

[Formula 2b]

[Formula 2c]

[Formula 2d]

[Formula 2e]

[Formula 2f]

[Formula 2g]

in formulas 2a to 2g,
$R_{31}$ to $R_{42}$ are each independently an alkyl group having 1 to 10 carbon atoms or a fluoroalkyl group having 1 to 10 carbon atoms,
$a_1$ is an integer of 0 to 2, $b_1$ is an integer of 0 to 4, $c_1$ is an integer of 0 to 8, $d_1$ and $e_1$ are each independently an integer of 0 to 3, $f_1$ and $g_1$ are each independently an integer of 0 to 4, $h_1$ and $j_1$ are each independently an integer of 0 to 3, $i_1$ is an integer of 0 to 4, $k_1$ and $l_1$ are each independently an integer of 0 to 4,
$A_1$, $A_2$ and $A_3$ are each independently selected from the group consisting of a single bond, —O—, —$CR_{46}R_{47}$—, —C(=O)—, —C(=O)O—, —C(=O)

NH—, —S—, —SO$_2$—, a phenylene group, and a combination thereof, wherein R$_{46}$ and R$_{47}$ are each independently selected from the group consisting of a hydrogen atom, an alkyl group having 1 to 10 carbon atoms and a fluoroalkyl group having 1 to 10 carbon atoms.

5. The polyimide precursor solution according to claim 3, wherein Y is a divalent organic group selected from the group of the following formulae 4a to 4d:

[Formula 4a]

[Formula 4b]

in formula 4b, L$_1$ is a single bond, —O—, —CO—, —S—, —SO$_2$—, —C(CH$_3$)$_2$—, —C(CF$_3$)$_2$—, —CONH—, —COO—, —(CH$_2$)n$_1$-, —O(CH$_2$)n$_2$O—, —OCH$_2$—C(CH$_3$)$_2$—CH$_2$O— or —COO(CH$_2$)n$_3$OCO—, and n$_1$, n$_2$ and n$_3$ are each an integer of 1 to 10,

[Formula 4c]

in formula 4c, L$_2$ and L$_3$, which are the same or different from each other, are each independently a single bond, —O—, —CO—, —S—, —SO$_2$—, —C(CH$_3$)$_2$—, —C(CF$_3$)$_2$—, —CONH—, —COO—, —(CH$_2$)n$_1$-, —O(CH$_2$)n$_2$O—, —OCH$_2$—C(CH$_3$)$_2$—CH$_2$O— or —COO(CH$_2$)n$_3$OCO—, and n$_1$, n$_2$ and n$_3$ are each an integer of 1 to 10,

[Formula 4d]

in formula 4d, L$_4$, L$_5$ and L$_6$, which are the same or different from each other, are each independently a single bond, —O—, —CO—, —S—, —SO$_2$—, —C(CH$_3$)$_2$—, —C(CF$_3$)$_2$—, —CONH—, —COO—, —(CH$_2$)n$_1$-, —O(CH$_2$)n$_2$O—, —OCH$_2$—C(CH$_3$)$_2$—CH$_2$O— or —COO(CH$_2$)n$_3$OCO—, and n$_1$, n$_2$ and n$_3$ are each an integer of 1 to 10, wherein at least one hydrogen atom contained in the aromatic rings of formulas 4a to 4d is unsubstituted or substituted with an alkyl group having 1 to 10 carbon atoms or a fluoroalkyl group having 1 to 10 carbon atoms.

6. The polyimide precursor solution according to claim 1, wherein the polyimide precursor further comprises a structure of the following formula 6 in the molecular structure:

[Formula 6]

wherein, p and q are molar fractions, and when p+q=100, p is 70 to 90 and q is 10 to 30.

* * * * *